US007535831B2

(12) United States Patent
Phelps et al.

(10) Patent No.: US 7,535,831 B2
(45) Date of Patent: May 19, 2009

(54) METHOD AND APPARATUS FOR PROVIDING GRADES OF SERVICE FOR UNPROTECTED TRAFFIC IN AN OPTICAL NETWORK

(75) Inventors: Peter Phelps, Nepean (CA); Brett Caldwell, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 900 days.

(21) Appl. No.: 10/662,400

(22) Filed: Sep. 16, 2003

(65) Prior Publication Data

US 2005/0058064 A1   Mar. 17, 2005

(51) Int. Cl.
*H04L 1/00* (2006.01)
*H04L 12/26* (2006.01)

(52) U.S. Cl. .................. 370/228; 370/225; 370/252; 370/395.21; 370/401; 370/468; 709/232; 709/242

(58) Field of Classification Search ......... 370/216–228, 370/241–252, 400, 351, 462, 395.1–468; 714/1, 2; 709/232–242
See application file for complete search history.

(56) References Cited

U.S. PATENT DOCUMENTS

| | | | | |
|---|---|---|---|---|
| 5,159,595 A | * | 10/1992 | Flanagan et al. | ............ 370/224 |
| 5,406,401 A | | 4/1995 | Kremer | ...................... 359/110 |
| 5,442,620 A | | 8/1995 | Kremer | ...................... 370/16.1 |
| 5,495,470 A | * | 2/1996 | Tyburski et al. | ............. 370/248 |
| 5,627,837 A | * | 5/1997 | Gillett | ........................ 714/708 |
| 5,731,887 A | * | 3/1998 | Fee | ............................... 398/5 |
| 5,870,382 A | | 2/1999 | Tounai et al. | ............... 370/220 |
| 6,091,709 A | | 7/2000 | Harrison et al. | |
| 6,256,292 B1 | * | 7/2001 | Ellis et al. | ................... 370/227 |
| 6,404,734 B1 | * | 6/2002 | Stamatelakis et al. | ....... 370/227 |
| 6,496,477 B1 | * | 12/2002 | Perkins et al. | ............. 370/228 |
| 6,530,032 B1 | * | 3/2003 | Shew et al. | ................... 714/4 |
| 6,614,790 B1 | | 9/2003 | Veres et al. | |

(Continued)

FOREIGN PATENT DOCUMENTS

CA          2287010          6/2000

(Continued)

OTHER PUBLICATIONS

Internet-Draft, Feb. 2003, SDH/SONET.

(Continued)

*Primary Examiner*—Edan Orgad
*Assistant Examiner*—Venkatesh Haliyur
(74) *Attorney, Agent, or Firm*—Kent Daniels; Blake, Cassels & Graydon LLP (57) ABSTRACT

A method for providing grades of service to unprotected traffic on an optical network that provides protection channels associated with working channels, defines a linearly ordered set of protection switch request priorities, and two or more grade of service priorities, and uses those priorities to enforce a protection access policy. The unprotected traffic may be of a high priority, approximating non-pre-emptable unprotected traffic (NUT); of low priority, like extra traffic; or may be of an intermediate priority between the two. This allows data transport providers to offer different unprotected transport services at different rates on protected links, in which the different unprotected transport services are associated with different probabilities of pre-emption.

13 Claims, 5 Drawing Sheets

U.S. PATENT DOCUMENTS

| | | | |
|---|---|---|---|
| 6,631,134 B1* | 10/2003 | Zadikian et al. | 370/395.21 |
| 6,680,984 B1* | 1/2004 | Teghararian et al. | 375/317 |
| 6,717,909 B2* | 4/2004 | Leroux et al. | 370/228 |
| 6,728,205 B1* | 4/2004 | Finn et al. | 370/217 |
| 6,888,791 B1* | 5/2005 | Ellis et al. | 370/227 |
| 6,895,441 B1* | 5/2005 | Shabtay et al. | 709/238 |
| 6,975,589 B2* | 12/2005 | Luft et al. | 370/222 |
| 6,992,978 B1* | 1/2006 | Humblet et al. | 370/228 |
| 7,020,077 B2* | 3/2006 | Mazzurco et al. | 370/217 |
| 7,058,010 B2* | 6/2006 | Chidambaran et al. | 370/218 |
| 7,058,011 B1* | 6/2006 | Stearns et al. | 370/219 |
| 7,113,698 B1* | 9/2006 | Ryhorchuk et al. | 398/10 |
| 7,197,008 B1* | 3/2007 | Shabtay et al. | 370/218 |
| 7,209,436 B1* | 4/2007 | Luft et al. | 370/222 |
| 7,352,966 B2* | 4/2008 | Chaudhuri et al. | 398/5 |
| 2001/0033570 A1* | 10/2001 | Makam et al. | 370/373 |
| 2001/0038607 A1* | 11/2001 | Honda | 370/218 |
| 2002/0024931 A1* | 2/2002 | Chikazawa et al. | 370/228 |
| 2003/0012134 A1 | 1/2003 | Ikawa | 370/227 |
| 2003/0063560 A1* | 4/2003 | Jenq et al. | 370/216 |
| 2003/0063613 A1* | 4/2003 | Carpini et al. | 370/401 |
| 2004/0179472 A1* | 9/2004 | Khalilzadeh et al. | 370/227 |
| 2004/0221058 A1* | 11/2004 | de Boer et al. | 709/238 |

FOREIGN PATENT DOCUMENTS

| | | |
|---|---|---|
| CA | 2317907 | 6/2001 |
| EP | 0 935 357 A2 | 8/1999 |
| EP | 1 059 750 A2 | 12/2000 |
| WO | WO 01/67685 A | 9/2001 |

OTHER PUBLICATIONS

Mukul Goyal, et al. "Shared mesh restoration: a simulation study", appears in Optical Fiber Communication Conference and Exhibit 2002, OFC 2002, CIS Dept., The Ohio States University, Publication Date Mar. 17-22, 2002, pp. 489-490.

Robert D. Doverspike, et al. "Fast restoration in a mesh network of optical cross-connects", appears in Optical Fiber Communication Conference 1999, and International Conference on Integration Optics and Optical Fiber Communication, OFC/IOC '99 Technical Digest, vol. 1., pp. 170-172, Publication Date 1999. AT&T Labs.

* cited by examiner

METHOD AND APPARATUS FOR PROVIDING GRADES OF SERVICE FOR UNPROTECTED TRAFFIC IN AN OPTICAL NETWORK

CROSS-REFERENCE TO RELATED APPLICATIONS

This is the first application filed for the present invention.

MICROFICHE APPENDIX

Not Applicable.

TECHNICAL FIELD

The invention relates generally to protection switching on optical networks and, in particular, to a method and apparatus for providing grades of service for unprotected traffic.

BACKGROUND OF THE INVENTION

Optical networks that, at the physical layer, include optical fiber transmission media and electrical domain switches, are well known in the art. A substantial proportion of today's data traffic traverses synchronous optical network (SONET), and synchronous digital hierarchy (SDH) standard networks, as well as converged SONET-SDH networks. These and other networks besides, provide an important failure recovery mechanism known as protection switching.

In accordance with earlier versions of the optical network standards (such as the current SONET ring standard issued by Telcordia GR-1230-CORE), each optical fiber span that interconnected adjacent network elements (NEs) was paired with a dedicated protection fiber span. In this way, when a failure condition is detected on a working channel through the fiber spans, automatic protection switching (APS) information (transmitted in an overhead of a frame for transporting the data) was used to switch the traffic to a protection channel defined over the protection fiber spans associated with the failed working fiber spans of the working channel. The costs of providing and maintaining dedicated protection fiber have led to two major improvements to protection switching schemes.

A first major improvement involved permitting use of the protection fiber spans for network traffic until a working path failure was detected by introducing an unprotected class of traffic, usually referred to as extra traffic. If a working fiber span associated with a protection fiber span failed, the extra traffic was "dropped" and the protected traffic on the working fiber span was sent over the protection fiber span. Extra traffic was therefore generally unreliable. So while the unused bandwidth of the otherwise unused protection fiber strand can be used, the value of this bandwidth is low.

The second major improvement to protection switching schemes involved permitting multiple working connections to 'reserve' respective chains of resources through a network, so that in the event of failure of one of the working paths, the failing connection can seize network resources, and establish a protection connection. Such protection schemes are known as 1:N protection schemes or shared protection schemes. A 1:N protection scheme that permits upto N working connections to share any protection resource, has been implemented on linear SONET/SDH network configurations.

In linear SONET/SDH network configurations, a NE at a downstream end of a channel that detects a failure may issue a request for protection switching by the NE at the upstream end. If the condition of the protection channel at the upstream NE indicates a higher priority user/request, the request from the downstream end is dropped and the other request at the higher priority is forwarded to the downstream NE, which is then obliged to cede the protection channel. Similarly, if a lower priority request for a channel is allowed before a higher priority request for the channel is received, the use of the channel is given to the higher priority requester, and the other (lower priority) channel is forced to cede the channel. Thus concurrent failures of multiple working channels are handled using a hierarchy of pre-emption values.

Generally the pre-emption priority hierarchy includes conditions for requesting a protection switch/occupying the protection bandwidth, including: a signal fail on the working channel, a signal degrade on the working channel, a wait to restore period after a signal fail/degrade on the working channel, a manual switch requested by network management, and a forced switch requested by network management. The working channel may further be associated with a grade of service that is used in the hierarchy. This pre-emption priority hierarchy is used to ensure that a protection access policy is followed. A protection access policy may include rules such as, for example: that a signal degrade on one channel does not pre-empt a signal failure on another, as a signal degrade has less impact on traffic than a signal failure; that a manual switch can be pre-empted by a signal degrade, so that a manual switch does not interrupt any traffic; that a forced switch cannot be pre-empted by any automatic protection condition; etc.

These two improvements are not mutually exclusive. Extra traffic is carried on current linear and ring SONET/SDH networks. It can be said that extra traffic represents a priority level equal to a "no priority reversion" message used to indicate that traffic is being returned to the working channel (i.e. a lowest priority level). It has further been identified that unprotected traffic is a desired class of service in its own right. More specifically, non-pre-emptable unprotected traffic (NUT) is a class of service that, as its name suggests, is assigned to a channel that cannot be used as protection, but is not, itself, protected. NUT ranks between protected traffic, and extra traffic when it comes to reliability in the sense that it is dropped if a loss of signal occurs; but it cannot be pre-empted by a working channel because the working channel has failed. Networks that provide NUT effectively take the channels devoted to NUT out of use for protection purposes. This designation of links as one of NUT, working and protection does not provide for desired flexibility.

What is desired is a method of handling protection switch requests that provides more efficient use of bandwidth, and specifically provides for the enforcement of a protection access policy that enables grades of service of unprotected traffic over protection channels, and other paths through an optical network.

SUMMARY OF THE INVENTION

It is therefore an object of the invention to provide a method of handling protection switch requests that provides more efficient use of bandwidth in an optical network.

It is a further object of the invention to provide for the enforcement of a protection access policy that enables grades of service of unprotected traffic carried by protection channels in an optical network.

The invention therefore provides a method for carrying unprotected traffic on protection channels in an optical network that provides transport for protected traffic using the protection channels for failover protection, and transport for unprotected traffic using idle protection channels.

The method comprises defining an ordered set of request priority values for requesting access to the protection channels, and a set of priority values for at least two grades of service for the unprotected traffic. A protection channel access policy is created to regulate access to the protection channels occupied by unprotected traffic of respective grades of service, in response to request priority values of received protection switch requests.

The invention further provides a method for handling a protection switch request received at a network element via a link of an optical network used to transport protected traffic, the optical network providing failover protection using protection channels, and adapted to transport extra traffic on unoccupied protection channels of the network. The method comprises determining a priority value associated with the priority switch request and a priority value associated with the protection channel by examining an occupancy of the protection channel referenced in the protection switch request, the occupancy being one of idle, occupied by unprotected traffic with a predetermined grade of service, and occupied by protected traffic switched from a protected working channel. The method further comprises applying a protection access policy based on a comparison of the priority value associated with the priority switch request and the priority value associated with the protection channel.

The invention also provides a protection switch processor for applying a protection access policy in an optical network that supports protected traffic and extra traffic at predefined grades of service using pre-provisioned working and protection channels. The protection switch processor comprises means for determining a priority value associated with a protection switch request message for requesting access to a protection channel; means for determining an occupancy of the protection channel; means for determining a priority value associated with the protection channel by determining a priority value associated with an occupant of the protection channel if the protection channel is occupied; and means for comparing the priority value associated with the protection switch request message to the priority value associated with the protection channel to determine which of the priority values is highest.

The invention therefore provides a method and apparatus for supporting and controlling extra traffic in an optical network. The optical network carries protected traffic on working channels, the protection being provided by protection channels provisioned in the optical network. The bandwidth capacity of the protection channels is used for carrying the extra traffic when the protection channels are idle. The extra traffic can be associated with one or more grades of service. Each grade of service has an associated priority value that determines whether the extra traffic can be displaced by any particular request for access to a protection channel occupied by the extra traffic.

Thus the extra traffic is equitably accommodated while an appropriate level of protection is provided for the protected traffic carried by the optical network.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides a method for enabling data communications vendors to offer a plurality of grades of service for unprotected traffic.

Figure 1:
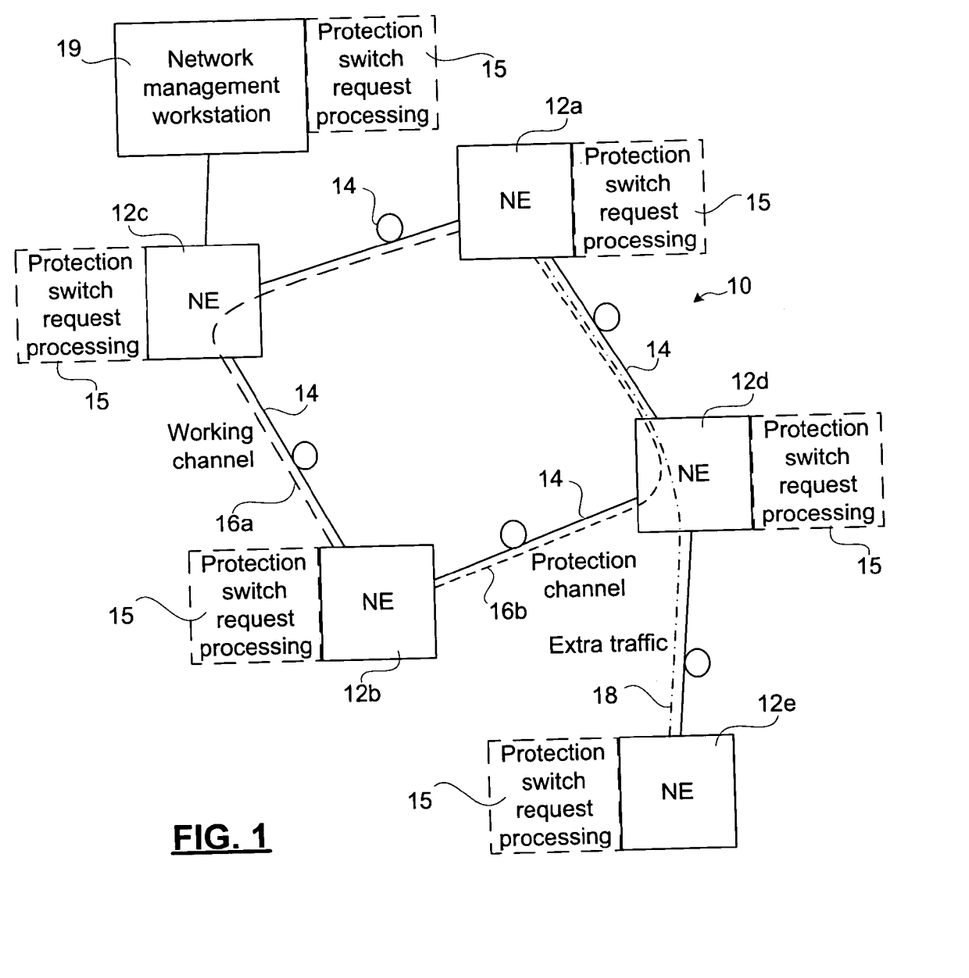
FIG. 1 is a schematic illustration of an optical network provisioned with a protection channel, extra traffic, and a working channel.

FIG. 1 schematically illustrates an optical network 10 in which the present invention may be deployed. The network 10 includes five network elements 12 (NEs), individually identified as NEs 12a, b, c, d, e, respectively. The NEs 12 elements are interconnected by optical fiber links 14 and may be configured in any of the topologies known in the art of optical networking; including line-, ring- and mesh-connected network topologies. The optical fiber links 14 may be bidirectional or unidirectional links and may be an aggregate of individual strands of optical fiber medium.

In such a network 10, data channels 16 may be defined by switch-connecting (a portion of) data transport capacity of respective optical fiber links 14. The data channels 16 are intended to be trans-network or sub-network connections of a predetermined data transport capacity. The data transport capacity occupying a given fraction of the data transport capacity of any given link. As such the term encompasses a single wavelength channel, a WDM fiber link, a tunnel provisioned across a plurality of parallel optical fiber links, and a tunnel provisioned using a proportion of a data transport capacity of a link. Two such data channels 16 are defined between NE 12a and NE 12b, each passing through diverse optical fiber links 14, and intermediate NEs 12. A first of these data channel 16a is provisioned as a working channel, and a second data channel 16b is provisioned as a protection channel. These two data channels 16a, 16b are paired so that the working channel 16a is associated with the protection channel 16b.

The pairing of the working channel 16a with the protection channel 16b is not intended to imply a limitation to a 1-to-1 protection scheme, in which one working channel is associated with 1 protection channel. Some optical networks in which the present invention may be deployed provide a shared or 1:N protection scheme, wherein N working channels can be associated with the same protection channel. Furthermore, in accordance with an M:N protection scheme, each working channel can be associated with up to M protection channels, and each of the protection channels can be associated with up to N working channels. The 1:N protection scheme provides significant reduction of under utilized data transport capacity, in comparison to the 1-to-1 protection scheme. The M:N protection scheme further reduces the probability of traffic interruption by distributing failure protection resources over the M diverse protection channels. It should be noted that any one of these protection schemes may be used in a network in which the invention is deployed.

As the protection channel is only used in the event of a failure of a working channel, such as working channel 16a, both legs (i.e. optical fiber links) of the protection channel 16b remain unutilized as long as the working channel 16a remains operational. The network 10 is provisioned to use such generally unutilized data transport capacity to carry unprotected traffic, generally known in the art as "extra traffic". For example, the second leg of the protection channel 16b may be used to permit the conveyance of extra traffic 18. The extra traffic 18 is switched through NE 12d and is further conveyed between NE 12a and NE 12e.

In accordance with some networks, each NE is adapted to perform protection switch request processing 15. Protection switch request processing 15 is applied upon receipt of a protection switch request, which is generated internally, by a detected condition of hardware (i.e. failure of a port, or a card, etc), in some optical networks. In such optical networks the NEs 12 are aware of the occupancy of all of the NEs in the respective channels. Accordingly, the protection switch request processing 15 at the NEs 12 will identify availability of the channel before issuing a protection switch request message to the other NEs of the channel. In other networks all of the NEs in the channel and occupancy of downstream links are not known, and in these other networks, some of the protection switch requests are received internally, while others are received from adjacent NEs in the channel, in accordance with a distributed protection switch request processing mechanism, such as described in co-pending, co-assigned U.S. patent application Ser. No. 10/691,522 filed on Oct. 24, 2003 and entitled METHOD AND APPARATUS FOR PROTECTION SWITCH MESSAGING ON A FRAME-BASED SHARED MESH NETWORK which is incorporated herein by reference.

As is the case in many optical networks, data channels 16 are provisioned by a network management system, whereas the extra traffic is provisioned hop-by-hop through the optical network 10, subject to availability of the data transport capacity on respective optical fiber links 14. Typically such a network management system includes at least one network management workstation 19 that executes network management software and provides an interface for network management personnel to provision channels, etc. The network management workstation 19 may be used to effect centralized protection switch request processing 15 for all of the NEs 12 of the optical network 10. The protection switch request processing 14, as explained above, controls access to the protection channels.

Figure 2:
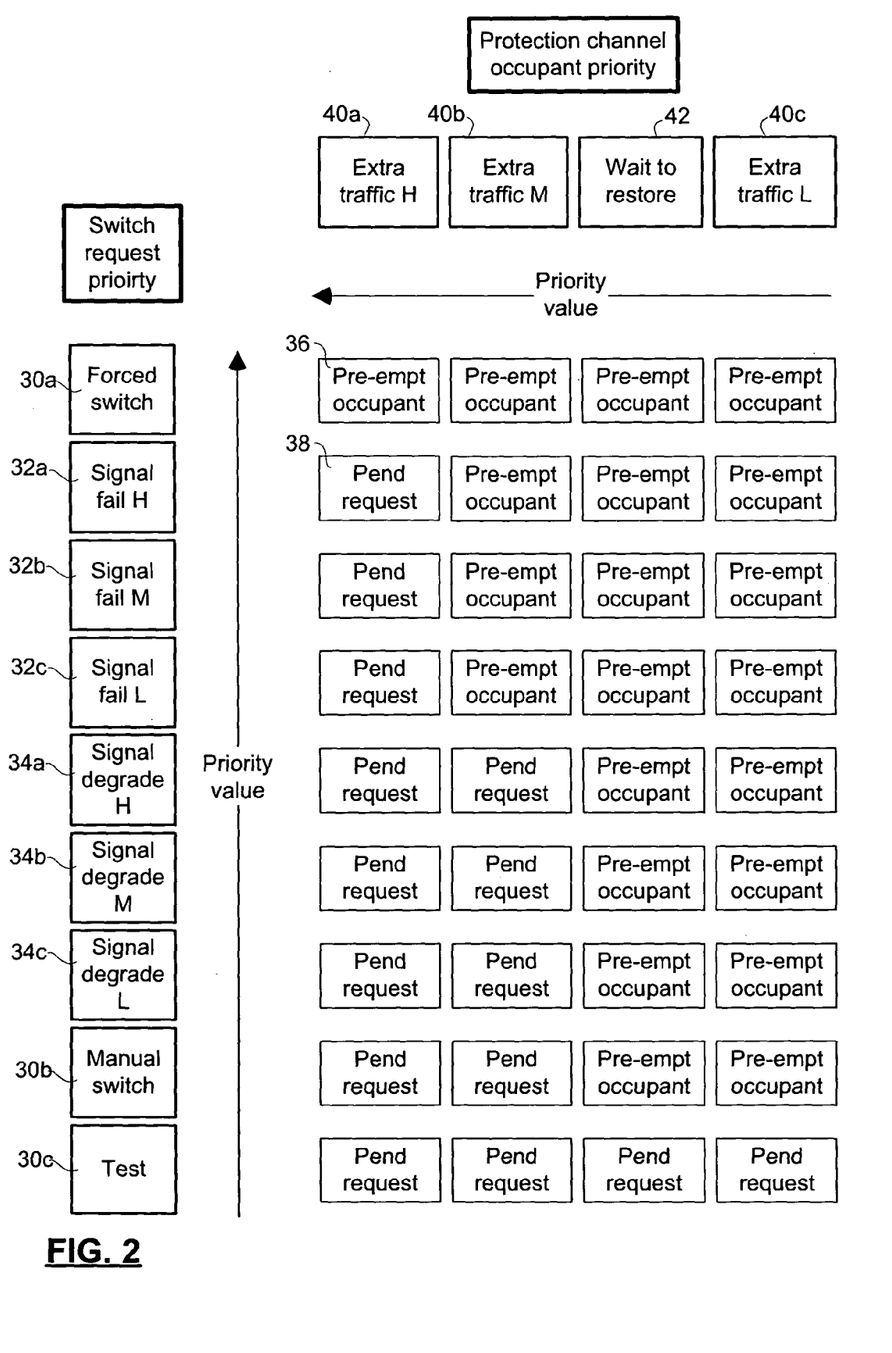
FIG. 2 is a schematic illustration of action taken by a NE in response to receipt of switch requests having different associated request priority values with respect to a priority of a current occupant of a protection channel.

FIG. 2 schematically illustrates the response of a protection switch processor to a priority-based protection switch request, in accordance with one embodiment of the invention. The protection switch processor may be embodied in the NEs, or may be part of a network management function, etc. Further in some optical networks (like SONET rings), a state of occupancy of nodes in the network is determined from messaging conveyed across the NEs. In such embodiments the protection switch processor receives protection switch requests from the processing of conditions of the links and network management. Peer NEs with access to channel utilization over the ring, decide whether access is permitted before notifying other NEs of a protection switch. Hereinafter it will be assumed that the protection switch processor is a part of the NE that has a role in determining if the protection switch is to be permitted on a link to a next NE in the protection channel, using information not available to other NEs of the protection channel. Use of such information that is not available to the other NEs of a protection channel is required, for example, if each optical fiber link's data transport capacity can be reserved for numerous different protection channels that have different end NEs. It should be noted, however, that this represents only one embodiment of a network in which the invention can be deployed.

When a protection switch request that is received requests use of data transport capacity between the NE and an adjacent NE, the protection switch processor identifies a request priority associated with the message, and an occupancy of the data transport capacity associated with the protection channel of the request. In accordance with the illustrated embodiment of the protection request messaging, the request priority is one of the following: a forced switch indication 30a; an indication of a signal fail condition 32 of a working channel of a high 32a, medium 32b, or low 32c grade of service; an indication of a signal degrade condition 34 of a working channel of a high 34a, medium 34b, or low 34c grade of service; a manual switch 30b; and a test request priority 30c. The signal failure 32 and signal degrade 34 conditions are automatically detected, and so protection switch messages for these request priorities are sent in response to changes in the conditions of corresponding working channels. On the other hand, manual switch 30b and forced switch 30a requests are issued by network management. The manual switch 30b does not impact existing traffic, whereas the forced switch 30a ensures that network management can commandeer any channel, if required. The test protection switch request is also initiated by network management, and may be automated, or partially automated. For example, the test request message may be scheduled by network management personnel or software. The purpose of a test request priority 30c protection switch request is to establish whether a protection switch would have succeeded when requested. Such a test is usually performed during periods of low network utilization by an exerciser function encoded in software.

A protection switch request for data transport capacity at any of these request priorities may be received at the protection switch processor of an NE 12, which ensures that a protection access policy is respected. The protection switch processor of the NE 12 therefore determines a current occupancy of the identified data transport capacity. The occupant of the data transport capacity may be extra traffic 40 of a particular grade of service; a wait to restore priority level 42; or a working channel associated with one of the request priorities identified above. It should be noted that in some embodiments a protection channel occupant may have different ends and use different resources than a working channel issuing a subsequent protection switch request. All that the request protection channel and the occupant request channel need to have in common is the reservation and use of the data transport capacity, respectively. The data transport capacity may also be idle (i.e. unoccupied), in which case any protection switch request would be granted access to the data transport capacity. If the occupant is a working channel, the linear order of the request priorities (30-34) illustrated, with the forced switch 30a being the highest request priority, and the test request priority 30c being the lowest, is respected; in accordance with the illustrated embodiment of the protection access policy. In other words, if a working channel that currently occupies a protection channel that uses the data transport capacity, is associated with a request priority of a priority value equal or greater than the request priority of a received protection switch request, the received protection switch request is refused. A refused request, in accordance with the illustrated embodiment, becomes pended 38, so that if/when the working channel vacates the data transport capacity, the pended request is returned to indicate that the protection switch request may be re-issued. Otherwise, the working channel's occupation of an occupant protection channel that uses the data transport capacity is pre-empted by the request, and the working channel is forced to cede the use of the occupant protection channel 36.

The occupant may have a priority level that is associated with a change in a condition of the working channel that does not correspond to a request for a protection switch. For example, in revertive protection schemes, a working channel that is automatically switched to a protection channel will revert to the working channel, when the condition of the working channel that required the protection switch, is repaired. However, it is known in the art to wait a predefined "wait to restore" time before reverting to the working channel, to ensure that the working channel is fully operational. While a working channel occupying the data transport capacity is waiting to revert to the restored working channel, the priority of the occupation is down-graded to that of the wait to restore occupation priority 42.

In accordance with the invention, extra traffic 40 is provided with a grade of service associated with a respective probability of service interruption. The illustrated embodiment provides a protection access policy that supports the grades of service for extra traffic, and incorporates these grades of service into priority-based protection switch request handling. In the illustrated embodiment, three grades of service for extra traffic are provided: high 40a, medium 40b and low 40c.

The high grade extra traffic 40a is similar to non-preemptable unprotected traffic (NUT), in that a failure of a working channel cannot force interruption of the unprotected traffic. However, NUT-designated links in an optical network are effectively removed from the protection traffic network, so bandwidth is not shared between NUT and protection/extra traffic, and no response is available to relative changes in demand for NUT and protected and extra traffic except on a link-wide basis. Further NUT is not managed in the same way as the protected and extra traffic in prior art systems, and simplification of network management operations is permitted using high grade extra traffic 40a instead of NUT. It remains possible to assign links for NUT and to use the remainder of the optical network for providing protected and unprotected traffic in accordance with the invention.

Medium grade extra traffic 40b has a priority intermediate between signal failure and signal degrade conditions. Accordingly if a working channel fails, the working channel is provided access to the data transport capacity occupied by medium grade extra traffic 40b, but if the working channel is merely degraded, medium grade extra traffic 40b is not forced to relinquish the data transport capacity.

Low grade extra traffic 40c is similar to extra traffic on current network configurations, in that it is prone to be preempted by either a working channel or network management in either a signal fail or a signal degrade condition, or a network management initiated manual switch.

Figure 3:
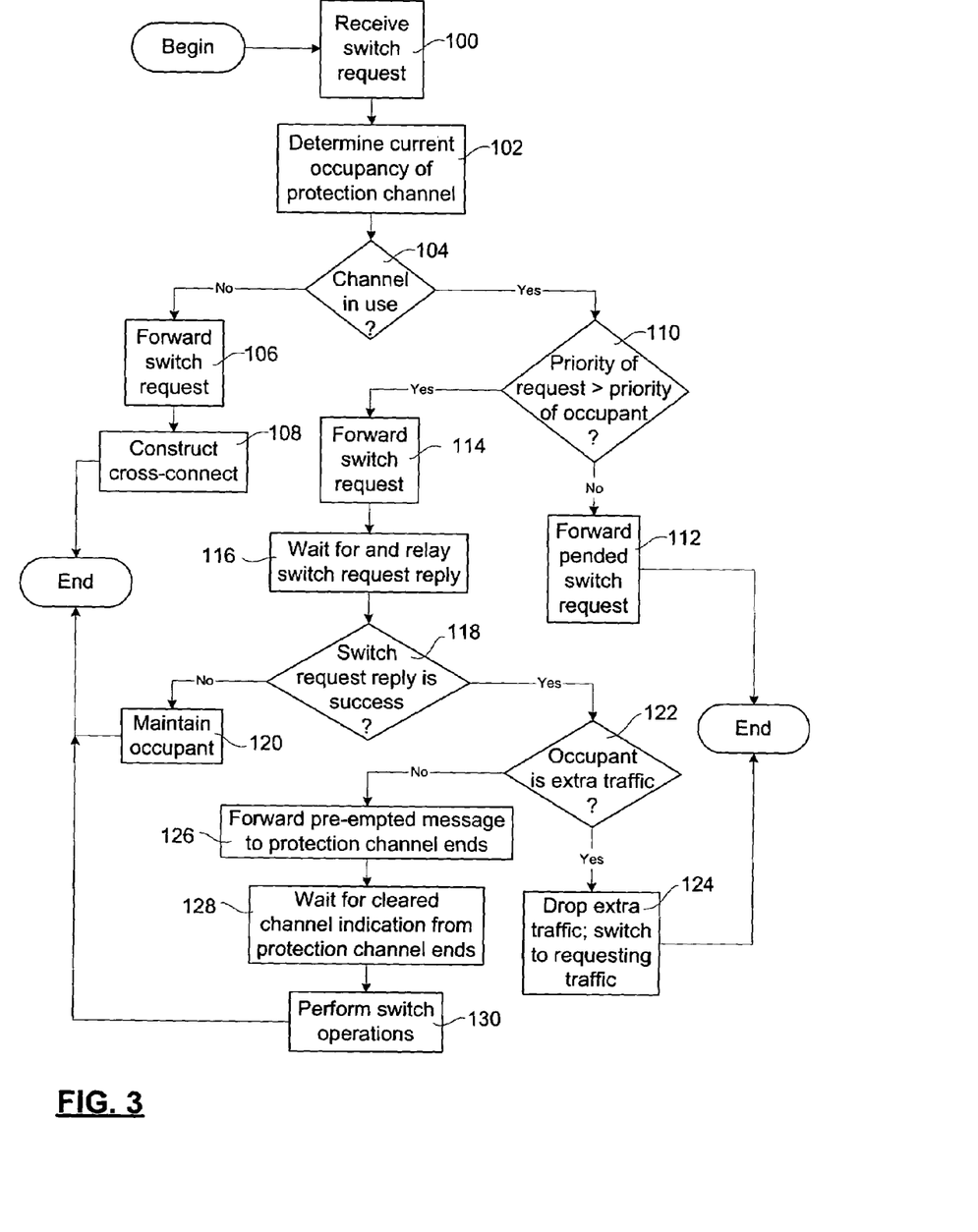
FIG. 3 is a flow chart illustrating principal steps involved in handling a protection switch request, in accordance with an embodiment of the invention.

FIG. 3 illustrates principal steps involved in protection switch request handling at any NE 12, in accordance with the illustrated embodiment of the invention. The procedure begins when a protection switch request is received (step 100), and inspected to identify the request priority, and data transport capacity associated with a protection channel of the protection switch request. The NE 12 (step 102) determines a current occupancy of the identified data transport capacity associated with the (requesting) protection channel. If the data transport capacity is determined (step 104) to be idle, the NE 12 forwards the switch request to a next NE 12 in the protection channel (step 106), and begins constructing a cross-connect through a switch fabric of the NE 12 (step 108), in order to erect a part of a protection channel.

Otherwise, it is determined (step 104) that the identified data transport capacity is in use, and the occupant priority (e.g. the request priority of a working channel that occupies the data transport capacity with an occupant protection channel, the extra traffic grade of service, or the wait to restore priority value) is identified. The occupant priority is compared to the request priority (step 110) so that if the request priority is less than or equal to the occupant priority, the request is pended, and required messaging to pend the request is transmitted (step 112). Otherwise, the protection switch request is of a higher priority than the occupant, and the protection switch request is forwarded to the next NE 12 in the protection channel (step 114). A reply to the protection switch request is received after the protection switch request has been forwarded to all of the other NEs in the protection channel. Each of these other NEs 12 have either accepted the protection switch request and relayed it, or pended the protection switch request. If all of the other NEs have accepted the protection switch request, the reply will indicate that the protection switch request has not been pended, in which case the protection switch is deemed a success.

Accordingly, in step 116, when the reply to the protection switch request that is waited for is received, it is relayed back to a previous NE in the protection channel. The reply is inspected to determine whether the request was successful or pended. If the priority switch request was pended by one of the other NEs 12 in the protection channel (step 118) an occupant of data transport capacity on another link in the protection channel could not be pre-empted (step 120), and the current occupant of the data transport capacity is not affected by the (failed) protection switch request. Otherwise, the other NEs in the protection channel have determined that the request is allowed, and the NE pre-empts the occupant. It is determined (step 122) whether the channel is occupied by extra traffic, or is another (occupant) protection channel. If the data transport capacity is occupied by extra traffic, the extra traffic is dropped, and the NE 12 begins constructing the cross-connect through its switch fabric (step 124). Otherwise a pre-empted message is sent to the ends of an occupant protection channel (step 126) directing the occupant to relinquish access to the data transport capacity. When a reply to the pre-empted message is received that identifies that the occupant protection tunnel is ceded (step 128), the NE 12 begins switch procedures (step 130) that prepare the NE 12 to handle traffic of the (requesting) protection tunnel (i.e. the construction of the cross-connect through a switch fabric, etc.).

Figure 4A:
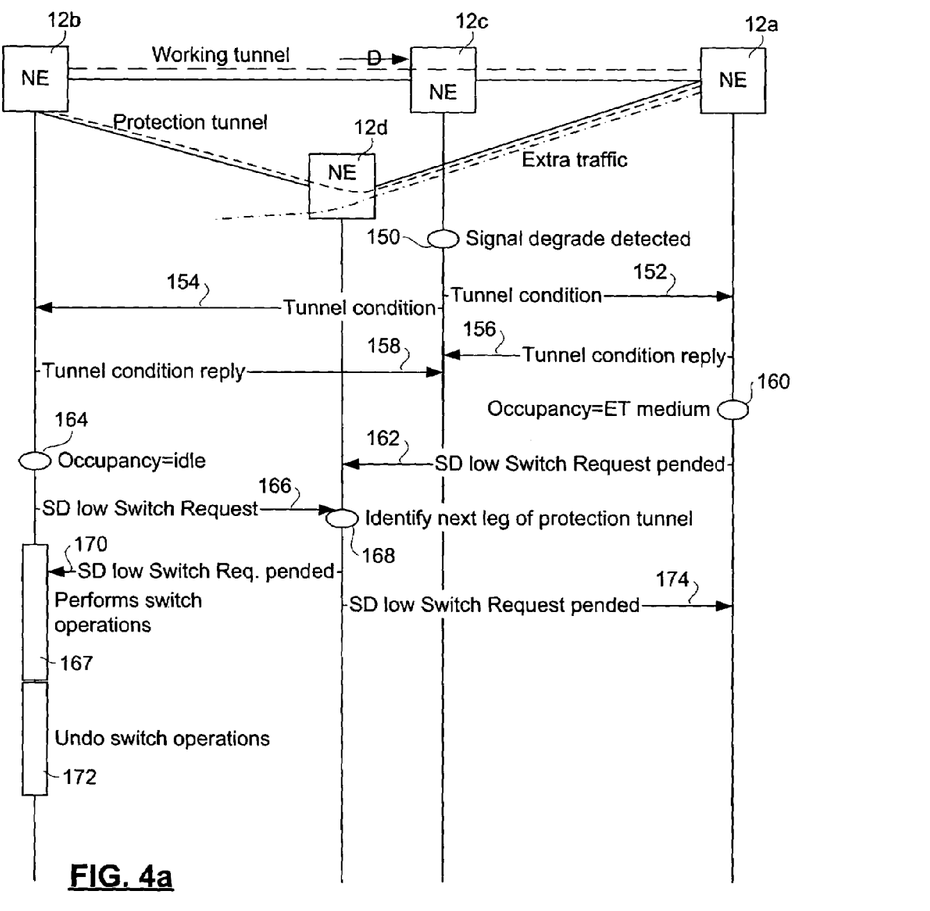
FIG. 4a is a call flow schematically illustrating a pended request, in accordance with a preferred embodiment of the invention.

FIG. 4a is a message flow diagram illustrating principal messages exchanged between NEs 12 of an optical network in accordance with an embodiment of the invention. The optical network may the optical network 10 shown in FIG. 1, except that a number of further assumptions have been made about the configuration of the NE 12. It is assumed that the channels are bidirectional tunnels (i.e. each channel is a pair of tunnels in opposite directions), and that the NEs 12 are a part of a mesh connected network that permits reservation of protection data transport capacity on links by multiple working tunnels having respective ends. In such networks, each link supporting protection data transport capacity could be in any state of occupancy, independently of all of the other reserved data transport capacity that forms the protection tunnel. Accordingly each NE in a protection tunnel independently controls access to the protection tunnel. It should be noted that in some fields of technology "mesh networks" are networks that are fully interconnected (i.e. each NE 12 is connected to every other NE 12), or at least exhibit a high level of connectivity, such constraints are not intended by the term as used in this document. Mesh networks are NEs with any degree of connectivity.

Initially a low grade of service working tunnel extending between NE 12a and NE 12b, and passing through NE 12c is conveying traffic, and medium grade extra traffic 40b occupies a leg of the working tunnels associated protection tunnel, which passes through NE 12d. A signal degrade is detected at NE 12c in one direction of a bidirectional link between the NE 12b and the NE 12c (step 150). This prompts the NE 12c to issue tunnel condition notices to NEs 12a, b toward respective ends of the affected working tunnel. Because of the configuration of the working tunnel, each end of the working tunnel receives the tunnel condition message directly from the NE 12c in steps 152 and 154. The NEs 12a, b, which are the ends of the working and protection tunnels, receive the tunnel condition notification, and return respective replies thereto (steps 156, 158). NE 12a is assumed to receive the tunnel condition message first, and accordingly is the first to apply a protection switch request handling procedure. The procedure involves identifying the protection data transport capacity reserved for the working tunnel, and then accessing the occupancy of the identified protection data transport capacity. As the extra traffic is using the protection data transport capacity between NE 12d and NE 12a, the occupancy is determined to be at an occupancy priority level of medium grade extra traffic 40b (step 160). Because the priority associated with the medium grade extra traffic is higher than that of the request priority (signal degrade low) the request is pended by NE 12a. A protection switch pended message is therefore sent to NE 12d (step 162).

Meanwhile, the NE 12b has identified the unoccupied protection tunnel data transport capacity between NE 12b and NE 12d as idle (step 162). Accordingly, the NE 12b has allowed the protection switch request, and forwards the protection switch request to NE 12d. NE 12d happens to receive the pended switch request from the NE 12a before the protection switch request from NE 12b. Because the received switch request message is pended, the NE 12d does not need to look up the occupancy of the identified protection tunnel data transport capacity, but rather identifies the next leg in the protection tunnel (step 168), so that it forwards the pended switch request (step 170) to the next NE in the protection tunnel (NE 12b).

NE 12b begins performing switch operations that ready the interconnection of traffic across the NE 12b, in anticipation of the use of the protection tunnel reserved between NE 12b, and NE 12d (step 167), after forwarding the protection switch request in step 166, and this construction has begun before processing of the pended switch request is received in step 170. The pended switch request 170 indicates that the protection tunnel is not going to be used (immediately), and the switch operations that have been effected must be undone, to liberate the resources (step 172).

Once the protection switch request is received at NE 12d from the NE 12b via the protection channel, it is correlated with the pended switch request, and although the protection switch request indicates a successful switch request, the pended status of the data transport capacity on the link to the NE 12b overrides the successful protection switch request, so that the pended switch request is forwarded to the NE 12a (step 174). All of the NEs 12 in the protection tunnel are therefore informed of the status of the requested protection switch (i.e., the request has been refused).

Figure 4B:
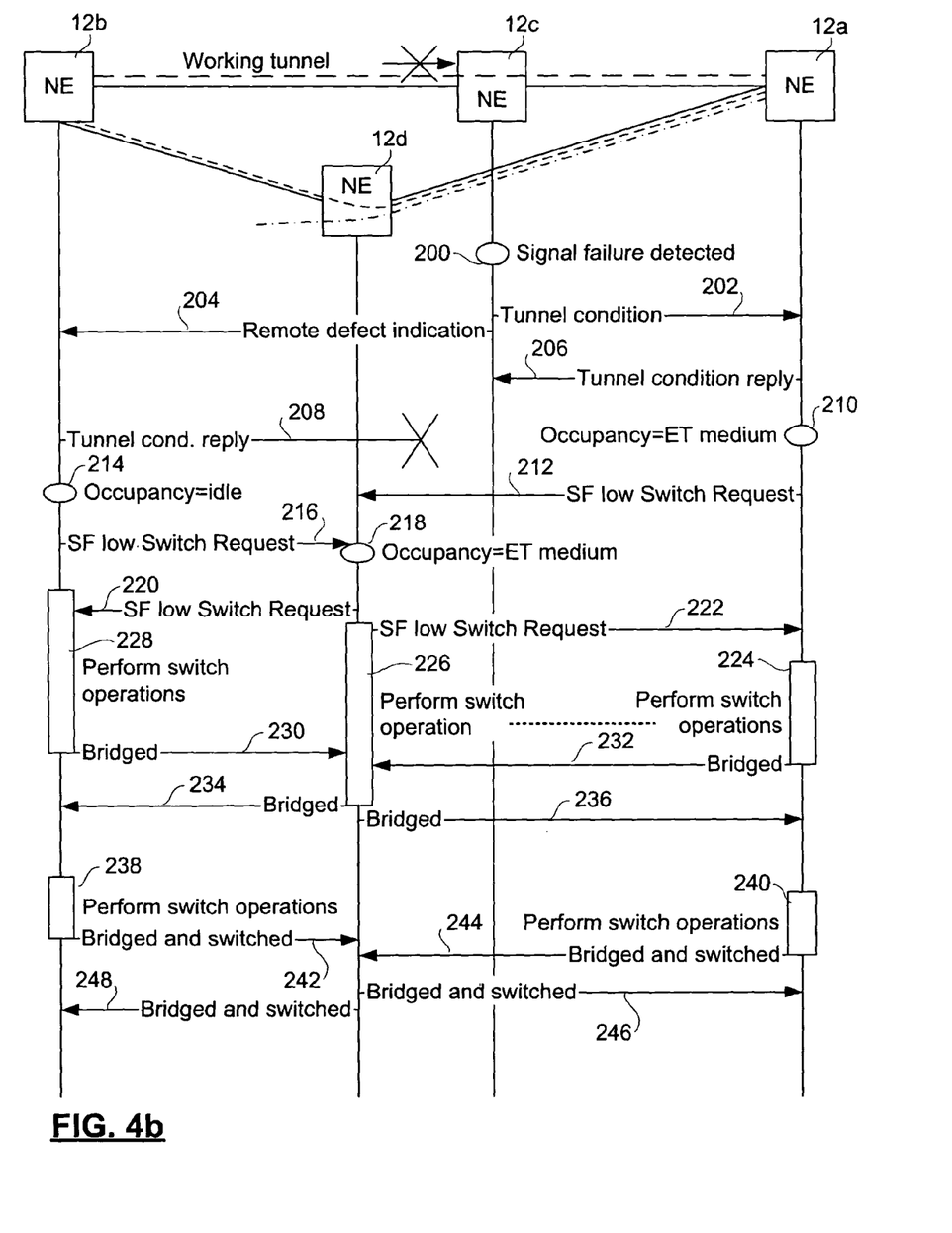
FIG. 4b is a call flow schematically illustrating dropping of unprotected traffic in response to a failure of a working tunnel, in accordance with an embodiment of the invention.

FIG. 4b illustrates principal messages involved in a successful protection switch request that appropriates a protection channel carrying extra traffic, in the network 10 described above with reference to FIG. 4a. In accordance with the scenario assumed in FIG. 4b, NE 12c detects a failure of the working tunnel, instead of a signal degrade, in step 200.

The hardware-initiated response to a signal failure is the insertion of an alarm indication signal into the message received at the NE 12c, which is used to trigger a tunnel condition message sent to NE 12a (step 202), and an insertion of a remote defect indication in messages sent on the paired working data transport capacity to NE 12b (step 204). Both end NEs 12a, b receive the tunnel condition message, and issue replies along paired channels to the NE 12c (steps 206, 208). Although the reply from NE 12a is received, the tunnel failure precludes reception of the reply from NE 12b (until the link is restored). Once the end NEs 12a, b issue the replies, they identify the data transport capacity associated with the associated protection tunnel, and determine the occupancy of the protection tunnel. At NE 12a this results in the identification of data transport capacity that is occupied by medium grade of service extra traffic (step 210), and so a protection switch request is forwarded to NE 12d (step 212). In contrast, at NE 12b, idle data transport capacity is identified (step 214), resulting in the transmission of a protection switch request to the NE 12d (step 216), and further results in switch operations being applied at the NE 12b to ready the protection tunnel for transporting traffic (step 228).

The NE 12d is assumed to receive the protection switch request from NE 12a first, and accordingly looks at the occupancy of the subsequent leg of the protection tunnel. The subsequent leg of the protection tunnel is determined to be idle, but the leg over which the protection switch request is received, is occupied by the medium grade extra traffic (step 218). Consequently the NE 12d forwards the pended protection switch request to the NE 12b (step 220), but does not begin the switch operations, until a successful protection switch request reply is received (in step 216) from the opposite direction. The protection switch request received in step 216 is relayed to NE 12a (step 222), and the NE 12d commences its switch operations (step 226). When the NE 12a receives the protection switch request message of step 222, it too begins the switch operations (step 224). The switch operations performed by NEs 12d, a further may require the exchange of messaging in order to remove extra-traffic, and verify that the extra-traffic is removed. This may be performed by messaging over the APS channel, or using any other signaling mechanism.

When NE 12b completes its switch operations, it issues a bridged message to the NE 12d (step 230). At this juncture, the NE 12d has not completed the switch operations, and so it waits for this completion before it forwards the bridged message. In fact NE 12a completes its switch operations before NE 12d, including the verification of the removal of the extra-traffic, and accordingly issues its bridged message to the NE 12d (step 232). Once the NE 12d verifies that the extra traffic has been removed by NE 12a, and completes its cross-connect etc. required to support the traffic over the local part of the protection tunnel, it relays both bridged messages via the respective subsequent legs in the protection tunnel (steps 234, 236). Upon receipt of the forwarded bridged message, the end NEs 12a, b advance to a state associated with an erected protection tunnel. The end NEs 12a, b therefore perform end point switch operations to transmit the traffic on both the working tunnel and the protection tunnel, and to select the traffic on the protection tunnel (steps 238, 240). Upon completion of the end point switch operations, the end NEs 12*a, b* forward bridged and switched messages to each other via NE 12*d* (steps 242, 244), the NE 12*d* relaying (in steps 246, and 248) these bridged and switched messages. The protection tunnel is now in a 'live' mode transporting traffic.

The method and apparatus for providing grades of service for unprotected traffic has therefore been described in which a protection access policy is respected to conditionally provide access to data transport capacity on protection channels.

The embodiment(s) of the invention described above is(are) intended to be exemplary only. The scope of the invention is therefore intended to be limited solely by the scope of the appended claims.

We claim:

1. A protection switch processor of an optical network that supports protected traffic and extra traffic at predefined grades of service using pre-provisioned working and protection channels, the protection switch processor executing under control of software comprising executable instruction code for:
   determining a priority value associated with a protection switch request message for switching protected traffic from a working channel to its associated protection channel;
   determining an occupant priority value associated with the protection channel by determining a service priority value associated with unprotected traffic within the protection channel;
   comparing the priority value associated with the protection switch request message to the occupant priority value; and
   refusing the protection switch request when a bandwidth of the working channel to be switched is greater than an unoccupied portion of the protection channel and the request priority value of the protection switch request is less than or equal to the occupant priority value of the protection channel;
   wherein refusing the protection switch request comprises pending the request so that if the unprotected traffic being transported through the protection channel subsequently releases the protection channel, a network element (NE) that issued the priority switch request is notified.

2. The protection switch processor as claimed in claim 1 wherein the software further comprises instruction code for:
   admitting the protection switch request if the protection channel is idle, or the occupant priority value associated with the protection channel is lower than the priority value associated with the protection switch request message.

3. The protection switch processor as claimed in claim 1 wherein the instruction code for admitting the protection switch request further comprises instruction code for:
   sending a pre-empted switch request message through the protection channel to direct unprotected traffic being transported through the protection channel to relinquish the data transport capacity of the protection channel.

4. In an optical network including predetermined protection channels for transport of protected traffic during a failover, a method for controlling access to each protection channel, the method comprising:
   assigning one of a predetermined set of at least two service priority values to each flow of unprotected traffic being transported through at least one protection path of the network;
   assigning one of a predetermined set of request priority values to each protection switch request for switching protected traffic from a working channel to its associated protection channel; and
   refusing a protection switch request when a bandwidth of the working channel to be switched is greater than an unoccupied portion of the protection channel and the request priority value of the protection switch request is less than or equal to the service priority value of unprotected traffic being transported through the protection channel;
   wherein refusing the protection switch request comprises pending the request so that if the unprotected traffic being transported through the protection channel subsequently releases the protection channel, a network element (NE) that issued the priority switch request is notified.

5. The method as claimed in claim 4, wherein the predetermined set of at least two service priority values comprises a first service priority value corresponding to a preemptable class of service, and a second service priority value corresponding to a non-preemptable traffic class of service.

6. The method as claimed in claim 4, wherein the first service priority value is higher than at least one of the predetermined set of request priority values.

7. The method as claimed in claim 6, wherein the first service priority value is higher than request priority values associated with either one of:
   a degraded condition of the working channel; and
   a test protection switch initiated by network management.

8. The method as claimed in claim 4, wherein the second service priority value is higher than a request priority value associated with a signal fail condition of the working channel.

9. In an optical network including predetermined protection channels for transport of protected traffic during a failover, a method for handling a protection switch request, the method comprising:
   receiving the protection switch request for switching protected traffic from a working channel to its associated protection channel, the protection switch request including a request priority value;
   determining a current occupancy of the protection channel, the occupancy being one of idle, occupied by unprotected traffic associated with one of a plurality of grades of service, and occupied by protected traffic switched from a working channel with a specific request priority; and
   refusing the protection switch request when a bandwidth of the working channel to be switched is greater than an unoccupied portion of the protection channel; and the request priority value of the protection switch request is less than or equal to the service priority value of unprotected traffic being transported through the protection channel
   wherein refusing the protection switch request comprises pending the request so that if the unprotected traffic being transported through the protection channel subsequently releases the protection channel, a network element (NE) that issued the priority switch request is notified.

10. The method as claimed in claim 9 further comprising admitting the protection switch request if the priority value of the switch request is greater than the service priority value associated with the unprotected traffic being transported through the protection channel.

11. The method as claimed in claim 10 further comprising performing switch operations to route the protected traffic from the working channel to the protection channel if the protection switch request is admitted.

12. The method as claimed in claim 9 wherein refusing the protection switch request further comprises:
- forwarding a protection switch request pended message along the protection channel; and
- if the occupied portion of the data transport capacity of the protection channel subsequently becomes unoccupied, forwarding a message along the protection channel indicating that the protection channel is idle.

13. The method as claimed in claim 10 wherein admitting the protection switch request further comprises forwarding a pre-empted switch request message through the protection channel to request the unprotected traffic being transported through the protection channel to relinquish the data transport capacity of the protection channel.

* * * * *